United States Patent [19]

Liguori

[11] 3,786,378
[45] Jan. 15, 1974

[54] ROTARY STEPPED JOINT FOR WAVEGUIDES

[75] Inventor: Mario Liguori, Milan, Italy
[73] Assignee: Elettronica Aster S.r.l., Milan, Italy
[22] Filed: Dec. 18, 1972
[21] Appl. No.: 316,107

[30] Foreign Application Priority Data
Sept. 13, 1972 Italy .............................. 29120 A/72

[52] U.S. Cl. ........................................... 333/98 TN
[51] Int. Cl. ............................................ H01p 1/06
[58] Field of Search ..................... 333/98 TN, 98 R, 333/21 A

[56] References Cited
UNITED STATES PATENTS
2,947,955  8/1960  Bellamy et al. ................. 333/98 TN
2,969,513  1/1961  Brennalt ......................... 333/98 TN Primary Examiner—Rudolph V. Rolinec
Assistant Examiner—Wm. H. Punter

[57] ABSTRACT

Rotary stepped joint for waveguides of radar antennas, comprising stacks or packs of plates rotating on ball bearings, wherein the plates are spaced apert from one another and interconnected only by sets of balls, on which the plates are firmly compressed. The rotation of the first plate in the plate stack or pack causes by means of the balls interposed between the plates a rotation of proportionally decreasing angles for the subsequent plates. The joint is of a very simple structure and can be rotated by a substantially reduced strain.

3 Claims, 11 Drawing Figures

ROTARY STEPPED JOINT FOR WAVEGUIDES

This invention relates to a rotary stepping joint for waveguides.

It is known that rotary stepping joints for waveguides are used in radar antennas where the electrical characteristics thereof should be of an optimum level. Thus, the standing wave ratio VSWR for a stepping joint is in the order of 1.05, while that for the other joints is 1.3 and even more; the insertion losses for a stepping joint are in the order of 0.05 db over usual 0.25 db for the other joints; finally, the maximum power transmitted by a stepping joint is the same as that of a rectilinear waveguide.

There is only one difficulty in wide spread use of these joints in waveguides for radar antennas, consisting of the difficult construction thereof, as a result that the stepping joints for radar waveguides have to vary the attitude thereof when in use.

The prior art rotary stepping joints for waveguides comprise stacks of metal plates forming the several steps. Theoretically, these plates should frictionnessly rotate relative to one another, while being closely adjacent one another, and more particularly the spacing between one plate and the adjacent plate being in the order of only a few microns. The angle of rotation for the several plates in a joint should be proportionally decreasing: for example, should the first plate in a five-step joint be rotated through 40° and the fifth plate held stationary, then the second plate should rotate through 30°, the third plate through 20° and the fourth plate through 10°.

According to the various use requirements, said plates are to be made of optimum electrically conducting metals, such as aluminum, copper and silver, but involving the disadvantage ensuing from the nature of such metals which are soft and readily seizable. In the prior art stepping joints the several plates were overlapping one another and compressed on one another by a spring, while the proportional rotation of said plates was provided by a set of gears of several ratios transmitting the movement from one to another plate.

These joints suffer from many disadvantages, particularly due to the complicated structure thereof, the weight thereof, the relatively high frictions which are to be overcome in order to transmit the movement from one to another plate, and the high maintainance such joints require.

The main object of the present invention is to provide a rotary stepping joint for waveguides, which is of a simple and easy construction, low cost of production, high accuracy, light weight and such that substantially no maintainance is required.

These and still further objects are accomplished by a rotary stepping joint for waveguides comprising a stack of plates overlapping one another, each of which provided with at least one rectangular hole forming the section of a waveguide for an individual step, each of the plates being made of at least two discrete materials, of which one is a highly electrically conducting metal having said rectangular hole formed therein, and the other of which being a material of high hardness forming at least that portion which in joint is the plate portion mechanically connected to a plate adjacent thereto, the joint being characterized in that at least three cylindrical holes of circular cross-section are formed in the hard material portion of each plate, each of such holes accomodating therein a very hard material ball substantially of the same diameter as the cylindrical hole, in that the thickness of said plates is slightly less than the diameter of said balls, in that the cylindrical holes of each plate in the joint are disaligned with respect to the similar holes in the plate adjacent thereto, and in that cutdown planes or faces are provided on the two plates adjacent the end plates of the plate stack, with balls abutting on said cutdown faces and also abutting on the end plates, the joint also comprising a rigid support to which the plates are connected by rolling bearings having a mutual common axis and retaining through two ball crowns the several plates compressed on one another.

For a better understanding of both the problem which is intendedto be solved, and the solution thereof, as well as the structure and operation of the rotary stepping joint for waveguides, two embodiments thereof will now be described by mere way of not limiting example, reference being had to the accompanying drawings, in which:

FIGS. 1, 2 and 3 and 4 schematically show rotary joints of a fully mechanical character;

In order to understand the operation of the rotary stepping joint for waveguides, reference will now be had to FIGS. 1-4.

Figure 1:
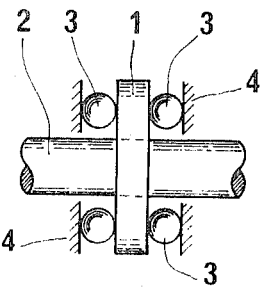

FIG. 1 shows a disc 1 which, having to rotate on a shaft 2 free of side clearance and side sliding friction, is laterally guided on two ball crowns 3 abutting on stationary walls 4, the whole acting as a double-thrust ball bearing.

Figure 2:
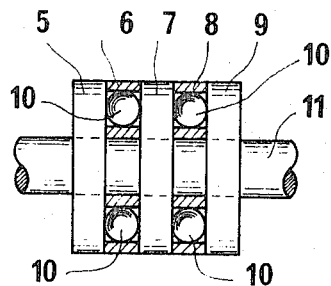

A double-thrust ball bearing is shown in FIG. 2 and comprises rings 5, 7 and 9 and two ball crowns 10 with associated guiding rings 6 and 8, said rings being freely rotably mounted on a shaft 11. The side surfaces of rings 5, 7 and 9 are flat, while the diameter of balls 10 is for a few microns larger than the thickness of the guiding rings 6 and 8. Assume that rings 5 and 9 are pressed against each other, and assume to rotate ring 5 through 40° while holding ring 7 at a stationary condition, it will be found that the guiding ring 6 rotates through 20°, according to the well known principle for ball bearings, in which the centers of the balls (and the associated guiding rings therewith) move on the circle containing such centers by a speed equal to the arithmetical mean of the peripheral speeds for the ball contact locations as measured on the rolling circles, or in the case shown, along the contact surfaces between the balls and flat surfaces of rings 5 and 7.

Still referring to FIG. 2, it will be seen that, assuming again to rotate ring 5 through 40° and to hold ring 9 stationary, and still supposing a frictionless condition, it results that the ball guiding ring 6 will rotate through 20° and ring 7 will remain stationary. However, ring 7 can be rotated independently of rings 5 and 9.

Figure 3:
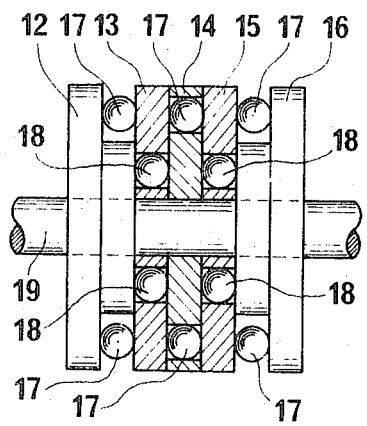

Referring now to FIG. 3, a ball bearing is schematically shown as comprising five discs or rings 12, 13, 14, 15 and 16, interconnected by two sets of balls 17 and 18, respectively, at a diffetent distance from the axis of a shaft 19 on which said rings are freely rotably mounted. Similarly to the case in connection with FIG. 2, and as wholly similar to the representation of the subsequent figures of the drawings, the diameters of the balls are for a few microns larger than the thickness of the discs or rings wherein said balls are accomodated and retained. As shown in FIG. 3, both a set of balls 18 and a set of balls 17 abut on the end discs 12 and 16, the set of balls 17 rolling on the opposing surfaces of the end rings and rings immediately adjacent thereto.

Assume that rings 12 and 16 are kept pressed against each other and to rotate ring 12 through 40° while holding ring 16 at a stationary condition, it will result that ring 13 rotates through 30°, ring 14 through 20° and ring 15 through 10°, thereby establishing a proportionally decreasing rotation for the several rings, just as required in stepping joints. It will be also appreciated that, in the ball bearing shown in FIG. 3, because of balls 17 being located on a diameter different from that of balls 18, the rings or discs could be rotated through any angle, even higher than 360°, since in no case said balls would interfer with one another.

Figure 4:
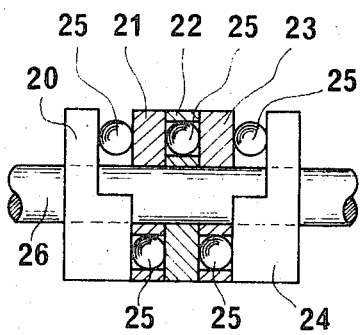

Since in stepping joints it is required that the several rings forming the joints should rotate through only a few degrees, the balls for all of the rings can be placed on the same diameter, as shown in FIG. 4 which is wholly similar to FIG. 3. More particularly, FIG. 4 shows five rings 20, 21, 22, 23 and 24 spaced apart from one another by balls 25 and freely rotatable on a shaft 26. These balls 25, lying on a same plane perpendicular to shaft 26, are alternately arranged, that is disaligned, with respect to the balls lying on a successive next plane, so that said balls will never interfer when the rings are rotated through a small angle. In FIG. 4 it will be seen that the outer rings 20 and 24 have a cutdown plane on a short section of the surface thereof, such a structure being imposed for a practical embodiment of the joint or bearing because of the balls being all located on the same diameter.

Figure 5:
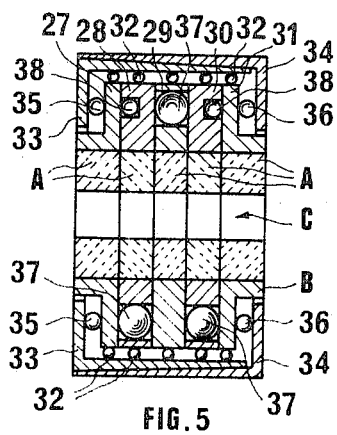
FIG. 5 is an axial sectional view of a rotary stepping joint for waveguides.
Figure 8:
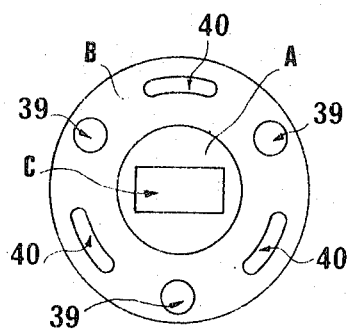
FIGS. 8 and 9 are plan views showing two plates comprising the joint.
Figure 9:
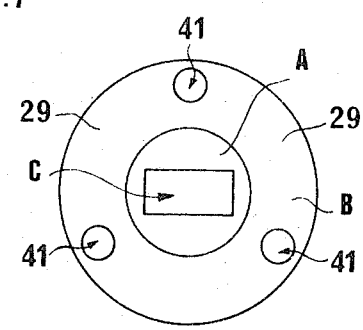

Reference is now directed to FIG. 5, showing in an axial sectional view a five-step rotary joint comprising five plates 27, 28, 29, 30 and 31 accomodated within a rigid sleeve, on which they are freely rotable on balls 32 about a common axis. From either side of said sleeve two annular flat walls 33 and 34, respectively, on which ball crowns 35 and 36 abut and roll, whereas the plates are interconnected and spaced apart from one another by sets of balls 37 and 38. While balls 37 are housed within cylindrical holes 39 passing through the plate thickness and are of a circular cross-section with a same diameter as said balls 37, balls 38 are housed within recesses or cavities 40 formed on a surface of plates 28 and 30, as clearly shown in FIG. 8, wherein one of said plates is shown in a plan view. Instead, FIG. 9 is a plan view showing plate 29, having therein only cylindrical holes 41 of a circular cross-section for accomodating said balls 37.

In the joint as shown in FIG. 5, balls 35 and 36 guide the plates within the outer rigid sleeve, while balls 32 enable the plates to rotate in spite of the pressure being exerted by the annular flat walls 33 and 34 of the sleeve. Similarly as set forth in connection with FIGS. 3 and 4, should plate 27 be rotated through 40° while plate 31 is held at a stationary condition, plates 28, 29 and 30 would rotate through 30°, 20° and 10°, respectively, about the axes thereof.

In the waveguide joint, the plates comprising the joint are of outer circular contour (FIGS. 8 and 9) and made of two discrete metal materials. More particularly, the central portion of each plate, portion A in the drawings, is made of a highly electrically conducting metal, such as aluminum, copper or silver. The radially outer portion of each plate, portion B in the drawings, is made instead of a highly hard material, such as nitrided steel, tungsten carbide and the like, or also corundum and the like, while the balls forming part of the joint are also to be made of highly hard materials. The inner portions A and the outer portions B of each plate can be firmly joined to one another by hot keyings, weldings, screws and the like.

As shown in FIGS. 5-9, in the inner portions A of each plate, as made of suitable materials for the construction of waveguides, rectangular holes C are provided and intended to form the waveguide section for an individual joint step.

Figure 6:
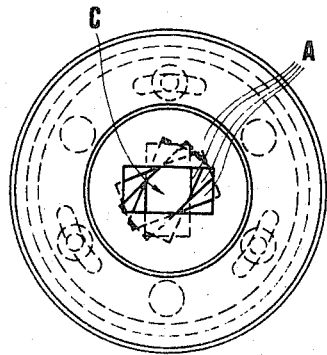
FIG. 6 is a front view thereof.
Figure 7:
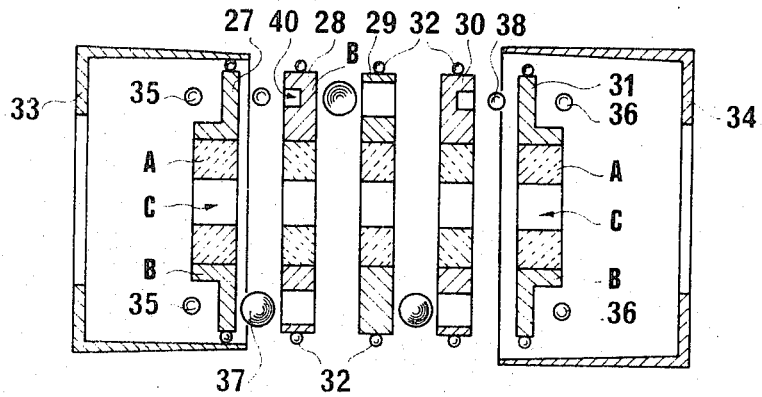
FIG. 7 is an exploded view thereof.

While in FIG. 5 said holes C are all exactly overlapping one another, that is the single joint waveguide is a straight or rectilinear waveguide, in the plan view of FIG. 6 the joint plates are rotated to one another, so that the waveguide is of a stepped helical pattern.

As it will be readily understood, the structure and embodiment of the stepped joint herein described is extremely simple, as simple and reliable is the operation and efficiency thereof, which is allowed for by the high accuracy by which the joint can be readily made.

Figure 10:
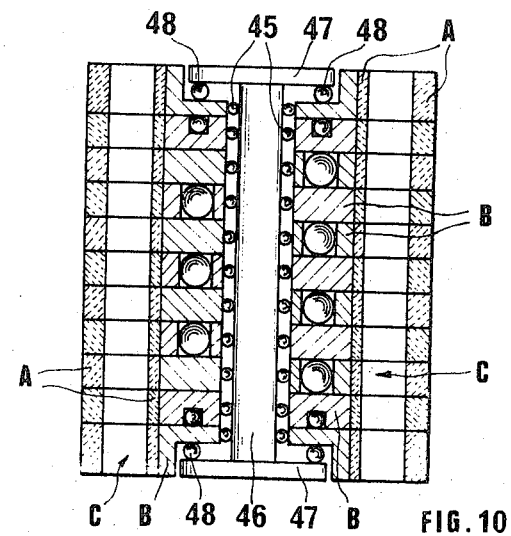
FIGS. 10 and 11 are axial sectional and front views, respectively, showing a second embodiment of the rotary stepping joint for waveguides.
Figure 11:
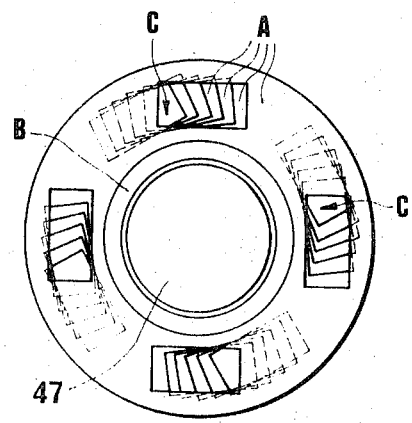

Reference is now directed to FIG. 10, showing therein in an axial sectional view an embodiment of a rotary stepped joint for waveguides different from that of FIGS. 5-9, this joint having its guides aligned, while being shown in a plan view in FIG. 11, wherein the waveguides are of a stepped helical pattern.

This joint comprises a stack or pack of eleven plates freely rotably mounted by balls 45 on a shaft 46 which at its two ends is provided with two flanges 47, balls 48 abutting and rolling on said flanges and holding said plates at a highly compressive state, just as hereinabove set forth.

Ecah of the joint plates in FIGS. 10 and 11 comprise an outer annular portion A made of a highly electrically conducting metal, and an inner portion B made of a highly hard material, similarly as hereinabove set forth.

Four discrete rectangular holes C are formed in the metal portion A of each plate. In FIG. 10, said holes C of the several plates have been shown exactly overlapping one another and aligned, while in the plan view of FIG. 11, having the joint plates been shown as rotated relative to one another, said holes C are displaced from one another by same angles, so that all of the four waveguides are of a stepped helical pattern.

The same considerations as made in connection with the joint in FIGS. 5-9 are also true for the rotary joint for the four-channel waveguides shown in FIGS. 10 and 11.

What I claim is:

1. A rotary stepping joint for waveguides comprising a stack or pack of plates overlapping one another, each provided with at least one rectangular hole forming the waveguide section of an individual step, each of the plates being made of at least two discrete materials, of which one is a highly electrically conducting metal having said rectangular hole formed therein, and the other of which being a highly hard material forming at least that plate portion in the joint which is mechanically connected to a plate adjacent thereto, wherein at least three cylindrical holes of a circular cross-section are formed in the hard material portion of each plate, a highly hard material ball substantially of the same diameter as the cylindrical hole being accommodated within each of said cylindrical holes, the thickness of said plates is slightly less than the diameter of said balls, the cylindrical holes of each of the joint plates are disaligned with respect to the similar holes in the plate adjacent thereto, said stack or pack of plates including an end plate on each end of said stack or pack, and a next-to-the-end plate adjacent each end plate, the side of said next-to-the-end plate abutting said end plate having cut down planes formed by recesses in said next-to-the-end plate, balls abutting on said cutdown planes and also abutting on the end plates, a rigid retainer compressing said plates together, said retainer being coupled to said end plates through ball crowns and being separated from a side of said stack or pack by roller bearings spaced along said side, 2. A rotary stepped joint for waveguides as claimed in claim 1, wherein said cylindrical holes of said plates are formed on different diameters for adjacent plates.

3. A rotary stepped joint for waveguides as claimed in claim 1, wherein said cylindrical holes of said plates are formed on substantially same diameters,.

* * * * *